United States Patent [19]

Shinomoto et al.

[11] 3,928,520

[45] Dec. 23, 1975

[54] BLACK LEAD AND PRODUCTION THEREOF

[75] Inventors: Masanori Shinomoto, Yokosuka; Kenji Oyaide, Kawasaki; Etsuo Shinkawa, Hiratsuka, all of Japan

[73] Assignee: Pilot Kiko Kabushiki Kaisha, Hiratsuka, Japan

[22] Filed: Aug. 18, 1972

[21] Appl. No.: 281,940

[30] Foreign Application Priority Data

| Aug. 19, 1971 | Japan | 46-63220 |
| Aug. 25, 1971 | Japan | 46-65000 |
| June 3, 1972 | Japan | 47-55523 |

[52] U.S. Cl. ............ 264/42; 106/19; 264/29; 264/43; 264/63
[51] Int. Cl.² .......................................... C09B 13/00
[58] Field of Search ...... 264/29, 43, 49, 63, DIG. 5; 423/448; 106/19; 51/296

[56] References Cited
UNITED STATES PATENTS

| 2,355,639 | 8/1944 | Ferst et al. | 106/19 |
| 3,254,143 | 5/1966 | Heitman | 264/29 |
| 3,262,904 | 7/1966 | Ripley | 260/41 R |
| 3,322,866 | 5/1967 | Bentolila et al. | 264/29 |
| 3,446,878 | 5/1969 | Tsukahara | 264/29 |
| 3,769,390 | 10/1973 | Weisbeck et al. | 264/29 |

*Primary Examiner*—Donald J. Arnold
*Assistant Examiner*—John Parrish
*Attorney, Agent, or Firm*—Wenderoth, Lind & Ponack

[57] ABSTRACT

A black lead is produced by kneading together at least graphite and a binder, adding to the mixture thus undergoing kneading at least one pore-forming material selected from inorganic substances, sublimable organic compounds and depolymerizable high polymers, extruding the resulting mixture into a thin raw lead at an extrusion speed through a nozzle of at least 4 meters/second, and burning the raw lead by heating to raise the temperature thereof gradually from 150° to 300°C at a rate of less than 5°C per hour, the pore-forming material being removed from the raw material during and/or after the burning step thereby to form minute continuous pores within the black lead.

11 Claims, No Drawings

BLACK LEAD AND PRODUCTION THEREOF

BACKGROUND OF THE INVENTION

This invention relates generally to writing, drawing, and/or marking implements of the type commonly referred at present as a "mechanical pencil" or a "pencil", which comprises a black lead of rod shape of a marking material and a covering or holder in which the marking material is enclosed.

More specifically, the invention relates to a novel process for producing black leads having an excellent writing feel, high bending strength, and darkness of lines drawn thereby.

In general, a product such as a black lead which is burned at a high temperature has fine pores or voids as a natural consequence. These pores in an ordinary black lead are impregnated with an oil (such oil-impregnated voids also being referred to hereinafter as "pores" for the sake of convenience). However, these pores give rise to a decrease in mechanical strength of the black lead, and, moreover, it is difficult to regulate the porosity and the distribution of these pores. For these reasons, there have been deviations in the properties such as strength, writing feel, and shade, i.e., darkness, of drawn lines.

Furthermore, the writing feel of a black lead does not depend only on the sliding smoothness of the black lead graphite because the pores existing in the black lead also have a delicate influence on the writing feel. More specifically, the parts around the pores of a black lead having suitable pores crumble under a relatively small force during writing, and, therefore, the black lead wears and is consumed in a desirable manner and has a so-called "soft touch" writing feel. Moreover, the written or drawn inscription is also dark and distinct.

Accordingly, the existence of pores is desirable for a good writing feel and for the proper shade of drawn lines. By known production processes, however, if a large number of pores exist, the strength of the black lead decreases, and, at the same time, deviations in the various properties of the black lead occur. Particularly in the case of thin black lead for mechanical pencils, which are required to have relatively high resistance to breakage by bending, it has been difficult to produce black leads of uniform strength, writing feel and shade.

In the production of black leads, the following are representative processes known heretofore:

1. The process which comprises kneading graphite together with a clay and water, extruding the resulting mixture into a raw lead (a raw material prior to accomplish burning at a high temperature), burning this raw lead at a temperature of from 800° to 1,000°C, and then impregnating the resulting black lead (a material obtained after burning the raw lead at a high temperature) with oil. 2. The process which comprises kneading graphite and carbon black together with a vinyl chloride resin, an organic solvent, and a plasticizer, extruding the resultant mixture into a rod-shaped raw lead, heating the raw lead thus extruded to raise its temperature gradually over 8 hours from a low temperature to approximately 300°C, burning the raw material further at 1,000°C, and then impregnating the resulting black lead with oil. 3. The process which comprises kneading graphite and carbon black together with coal tar pitch and/or the like, extruding the resulting mixture into a rod-shaped raw lead, heating the resulting raw lead to raise its temperature gradually up to 1,000°C or 3,000° C to accomplish burning, and then impregnating the black lead with oil. 4. The process which comprises kneading graphite together with the initial polymer of a thermosetting resin, a hydrophilic surfactant, wax, and an organic solvent, extruding the resulting mixture into a rod-shaped raw lead, immersing this raw lead in a setting agent, burning the raw lead at a temperature of from 800° to 1,000°C, and then impregnating the resulting black lead thus burned with oil.

5. The process which comprises kneading mica, graphite, and carbon black together with a vinyl chloride resin, a plasticizer, and an organic solvent, extruding the resulting mixture into a rod-shaped raw lead, heating this raw lead to raise its temperature gradually over a period of 10 hours from room temperature to 300°C, burning the raw lead further at 700°C, and then impregnating the resulting black lead with oil.

6. The process which comprises kneading an organic substance in the form of fine particles such as fine pulp particles (subsequently to be burned and carbonized or graphitized) together with a phenolic resin, an organic solvent, and a plasticizer, extruding the resulting mixture into a raw lead, burning this raw lead over a period of approximately 5 hours at temperatures from room temperature to 400°C, burning the raw lead further at temperatures up to 2,000°C, and then impregnating the resulting black lead with oil.

7. The process which comprises kneading graphite, and carbon black together with a product of dry distillation of a synthetic resin or of a hydrocarbon compound such as pitch, tar, and asphalt and a solvent, extruding the resulting mixture into a raw lead, and burning this raw lead at a temperature of the order of 1,000°C or more.

By these known processes, however, it is extremely difficult to adjust the porosity as desired and to produce a uniform distribution of the pores.

A black lead produced by kneading a coloring material such as graphite together with a binder such as a natural high polymer, a synthetic high polymer, the initial polymer of a thermosetting resin, pitch, asphalt, a product from the dry distillation of a synthetic resin or of a hydrocarbon compound and, when necessary a liquid such as an organic solvent, a plasticizer, and/or water and extruding the resulting mixture into a raw lead. This product has not only a low strength, but also nonuniform distribution of the pores if the rate of temperature rise at the time of burning is high. Accordingly, it is difficult to adjust the porosity and to prevent deviations in the properties of the black lead such as strength, writing feel, and shade of inscribed lines.

On the other hand, if the rate of temperature rise is low at the time of burning, the binder will contract fully as it carbonizes, whereby a black lead of extremely low porosity will be produced. While a black lead thus produced is extremely uniform and has high strength, its writing feel and darkness of drawn lines are unsatisfactory.

SUMMARY OF THE INVENTION

We have carried out research with the aim of imparting fine, continuous pores uniformly by an entirely original technique to this black lead of low porosity, uniform texture, and high strength thereby to improve the writing feel and darkness of drawn lines thereof.

As a result, we have found that a black lead of high strength, good writing feel, and dark drawn lines can be produced by a process of kneading a coloring material together with a binder or with a binder and a liquid, extruding the resulting mixture into a thin raw lead, and burning the raw lead as it is heated to raise its temperature gradually to a high temperature, which process is characterized in that, at the time of the kneading step, one or more pore-forming materials selected from inorganic substances, sublimable organic compounds and depolymerizable high polymers are added to the process mixture, and one or more of the pore-forming materials are removed during the burning step and/or after the burning step thereby to form minute, continuous pores within the black lead.

The nature, further features, and utility of this invention will be apparent from the following detailed description beginning with a consideration of general aspects of the invention and concluding with specific examples of practice illustrating preferred embodiments thereof.

DETAILED DESCRIPTION

In the case where an inorganic substance is used for the pore-forming material, fine, continuous pores are formed by removing it by any of the following procedures: (1) evaporating or sublimating the inorganic substance in the burning step; (2) immersing the inorganic substance in an aqueous acidic solution, an aqueous alkaline solution, or water thereby to cause elution of the substance in the burning step or thereafter; and (3) immersing the raw lead in an aqueous acidic solution, an aqueous alkaline solution, or water in the burning step thereby to cause elution of a portion of the inorganic substance and thereafter, in the step of further burning at a higher temperature, evaporating or sublimating the remainder of the inorganic substance.

In the case where a sublimable organic compound is used for the pore-forming material, it undergoes sublimation in the burning step, whereby fine, continuous pores are formed within the resulting black lead.

In the case where a depolymerizable high polymer is used for the pore-forming material, it undergoes depolymerization in the burning step to become a monomer or an oligomer and evaporates, whereby fine continuous pores are formed within the black lead.

Accordingly, this invention provides a process for producing black leads or marking-materials which has several advantageous features. For example, by selectively varying the particle size of the pore-forming material, the size of the resulting pores can be adjusted as desired, and by selecting the quantity of the added pore-forming material in each case, the resulting porosity can be adjusted at will. Furthermore, by carrying out the kneading step in a thorough manner and dispersing the pore-forming material uniformly, the distribution of the pores can be made uniform. As can ultimate result, black lead of high strength, excellent writing feel, and dark shade of written line is obtainable.

The aforementioned inorganic substance used in accordance with this invention is a substance which is soluble in an aqueous acid solution, an aqueous alkaline solution, or water or is a substance which, in the burning step, evaporates or sublimates. Specific examples are metals, metal oxides, metal sulfides, and various salts such as zinc, aluminum, copper, cadmium, zinc oxide, cadmium oxide, barium oxide, plumbous oxide, trilead tetroxide, magnesium oxide, barium carbonate, magnesium carbonate, lead chromate, zinc chromate, sodium carbonate, sodium sulfate, potassium sulfate, and sodium chloride.

Preferably, these inorganic substances are those which do not evaporate or sublimate at a temperature below the temperature at which carbonization of the binder progresses considerably, and contraction of the raw lead becomes conspicuous. These inorganic substances can be added in the form of fine powder, a suspension, or a solution at the time of kneading.

A sublimable organic compound suitable for use according to the invention is one which, at the time of burning at a high temperature for the purpose of causing sublimation in the burning step, leaves almost no residue of carbon within the raw lead. Specific examples of such compounds are Alizarin Blue, furan-2,5-dicarboxylic acid, isophthalic acid, 2-hydroxyanthraquinone, 2,7-dihydroxyanthraquinone, fumaric acid, fluoresceine, isonicotinic acid, terephthalic acid, anthraquinone, naphthacene, 5-methylisophthalic acid, thio-indigo, salicylic acid, and triethylamine hydrochloride. Sublimable organic compounds which undergo sublimation at temperatures above the temperature at which carbonization of the binder progresses considerably, and the contraction of the raw lead becomes conspicuous are preferable. These compounds can be added in the form of a powder, emulsion, suspension, or solution at the time of kneading.

A depolymerizable high polymer suitable for use according to this invention is one which, at the time of burning at a high temperature in order to depolymerize the high polymer and evaporate the same as a monomer or an oligomer in the burning step, leaves almost no carbon residue within the raw lead. Specific examples of such polymers are synthetic or natural high polymers such as polyethylene, polypropylene, polyisobutylene, polystyrene, poly-$\alpha$-methylstyrene, polymethacrylate, polytetrafluoroethylene, natural rubber, butyl rubber, nylon, and polymetamethylstyrene. Preferable high polymers are those which depolymerize at temperatures above the temperature at which carbonization of the binder progresses considerably, and the contraction of the raw lead becomes conspicuous. These depolymerizable high polymers can be added in the form of a powder, emulsion, suspension, or solution at the time of kneading.

Examples of coloring materials suitable for use in accordance with this invention are graphite, carbon black, molybdenum disulfide, tungsten disulfide, mica, and organic substances in fine particulate form. These coloring materials can be used singly or in combinations thereof. Graphite is particularly suitable.

Examples of suitable binders are natural high polymers, synthetic high polymers, initial polymers of thermosetting synthetic resins, products of dry distillation of synthetic resins or hydrocarbon compounds, pitch and asphalt. These binders can be used singly or in combinations thereof.

Examples of liquids suitable for use in the kneading step according to this invention are organic solvents, plasticizers, and water, selected in accordance with the kind of binder. However, in the case where the binder, itself, possesses good cohesive properties as in the case, for example, of coal tar pitch, it is not necessary to use a liquid.

In the practice of the black lead producing process according to this invention, the mixture which has been kneaded is charged into the cylinder of an extruder and is extruded into a thin raw lead.

In this process step, it is necessary that the mixture be extruded into the thin rod-shaped raw lead at a speed higher than 4 meters/second through the extruding nozzle of the extruder. The reason for this, as we have found, is that the mechanical strength of the finished black lead can be considerably improved by forming the raw lead by extrusion at a speed of over 4 meters/second.

We have found further that the heating of the extruded raw lead in the burning step should be carried out with a gradual rate of temperature rise which is of the order of from 1° to 5°C per hour at least in the temperature range of from 150° to 300°C. When the heating is carried out in this manner, a particularly uniform and strong black lead is obtainable.

After the raw lead has been heated gradually in this manner in the range of from 150° to 300°C the raw lead is burned further and finally in a non-oxidizing atmosphere such as an atmosphere of an inert gas or a reducing atmosphere at a temperature of at least 700°C thereby to produce a burned black lead.

While a black lead produced in accordance with this invention is amply suitable for practical use without impregnation of its pores with oils, fats and waxes, the shade of the written lines and writing feel of the black lead can be improved even further by impregnating the pores with these substances.

In order in indicate still more clearly the nature and utility of this invention, the following specific examples of practice indicating preferred embodiments of the invention and certain results are set forth, it being understood that these examples are presented as illustrative only, and that they are not intended to limit the scope of the invention.

In the Examples, the "part" is meant by "parts by weight".

EXAMPLE 1

50 parts of graphite as a coloring material, 30 parts of gum arabic, 20 parts of methylcellulose as a binder, and 32 parts of a suspension of zinc oxide, as an inorganic substance, of an average particle size of 0.10 micron in water, the non-volatile fraction of the suspension being 50 percent, were kneaded together with approximately 200 parts of water by means of a kneading machine, a triple rolling mill, and the like. As this kneading was carried out, the water content was adjusted to approximately 14 percent.

Thereafter, the kneaded mixture was charged into the cylinder of an extruder and extruded through an extrusion nozzle at an extrusion speed of 5.6 meters/second into a thin raw lead. The thin raw lead thus formed was dried and then burned in argon gas as its temperature was gradually raised from 160° to 300°C over a period of 70 hours. The temperature was then raised further to 1,050°C over a period of 5 hours, and then burning was continued at 1,050°C for one hour, during which the zinc oxide existing within the raw lead evaporated as zinc and was thereby removed. Finally, the black lead thus obtained was impregnated with spindle oil.

The black lead thus produced was found to have a porosity of 40 percent, a bending strength of 21,000 grams/mm$^2$, and a reflectivity (reflectance or reflection factor) of 50 percent.

EXAMPLE 2

45 parts of graphite, and 5 parts of carbon black as a colouring agent, 30 parts of gum arabic and 20 parts of methylcellulose as a binder, and 20 parts of calcium carbonate in the form of a fine powder of an average particle size of 0.58 micron as an inorganic substance were kneaded together with approximately 200 parts of water by means of a kneading machine, a triple rolling mill, and the like. As this kneading was carried out, the water content was adjusted to approximately 14 percent.

Thereafter, the kneaded mixture was charged into the cylinder of an extruder and then extruded through an extrusion nozzle at an extrusion speed of 10.0 meters/second into a thin raw lead. This thin raw lead was dried and then burned in argon gas as its temperature was gradually raised from 160° to 300°C over a period of 90 hours. The temperature was then raised further over a period of 4 hours to 800°C, at which temperature burning was further carried out for one hour.

The thin raw lead thus burned was then immersed for 15 hours in 2 liters of a separately prepared 17-percent aqueous solution of hydrochloric acid to which 2 grams of "Emulgen 930", a surfactant produced by Kao Sekken, K.K., had been added. In addition, ultrasonic waves were applied to the thin raw lead for two hours to cause elution of the calcium carbonate existing within the raw lead, which was then washed with water and dried. Finally, the resulting thin black lead thus obtained was impregnated with rape seed oil.

The resulting black lead was found to have a porosity of 29 percent, a bending strength of 22,000 grams/mm$^2$, and a reflectivity of 57 percent.

EXAMPLE 3

80 parts of graphite as a coloring material, 60 parts of sulfite lignin containing a lignin sulfonic acid calcium salt as its predominant constituent, and 20 parts of a polyvinyl alcohol used as a binder, and 25 parts of zinc oxide in the form of a fine powder of an average particle size of 0.14 micron as an inorganic substance were kneaded together with approximately 600 parts of water by means of a kneading machine, a triple rolling mill, and the like. As this kneading was carried out, the water content was adjusted to approximately 16 percent.

Thereafter, the kneaded mixture was charged into the cylinder of an extruder and then extruded through an extrusion nozzle at an extrusion speed of 8.2 meters/second into a thin raw lead, which was dried. This raw lead was then burned in argon gas as its temperature was gradually raised from 160° to 300°C over a period of 70 hours.

The raw lead thus burned was then immersed for 15 hours in 3 liters of a separately prepared 10-percent aqueous solution of hydrochloric acid to which 3 grams of "Emulgen 930" had been added, and approximately 50 percent of the zinc oxide existing within the raw lead was removed by elution. The raw lead was thereafter washed with water and dried.

The raw lead was then gradually heated over a period of 5 hours to a temperature of 1,050°C and burned at that temperature for 1 hour, during which the zinc oxide remaining within the raw lead evaporated and was thus removed. The resulting black lead was impregnated with spindle oil. The black lead thus obtained was found to have a porosity of 21 percent, a bending strength of 25,500 grams/mm²., and a reflectivity of 60 percent.

EXAMPLE 4

40 parts of graphite as a coloring material, 30 parts of gum arabic 30 parts of methylcellulose, as a binder and 30 parts of anthraquinone in the form of a fine powder of an average particle size of 10 microns as a sublimable organic compound were kneaded together with approximately 300 parts of water by means of a kneader, a triple rolling mill, and the like. As this kneading was carried out, the water content was adjusted to approximately 14 percent.

Thereafter, the kneaded mixture was charged into the cylinder of an extruder and extruded through a nozzle at an extrusion speed of 10.5 meters/second into a thin raw lead, which was then dried. The resulting raw lead was then burned in nitrogen gas by heating to raise its temperature gradually from 160° to 300°C over a period of 70 hours and was then burned gradually over a period of 5 hours to 1,000°C, at which temperature the raw lead was burned for a further 1 hour. During this burning step, the anthraquinone existing within the raw lead underwent sublimation and was removed. Finally, the resulting black lead was impregnated with spindle oil.

The black lead thus produced was found to have a porosity of 29 percent, a bending strength of 24,500 grams/mm², and a reflectivity of 57 percent.

EXAMPLE 5

60 parts of graphite as a coloring material, 40 parts of a petroleum asphalt (blown asphalt 20–30) dry distilled at 300°C as a binder, and 400 parts of a 5-percent solution in ethanol of fumaric acid as a sublimable organic compound were kneaded together with approximately 50 parts of toluene by means of a kneader, a triple rolling mill, and the like.

The resulting mixture was charged into the cylinder of an extruder and extruded through a nozzle at an extrusion speed of 5.5 meters/second into a thin raw lead which was then dried. The resulting raw lead was burned by heating in argon gas to raise its temperature gradually over a period of 70 hours from 160° to 300°C and was heated further over a period of 5 hours to 1,000°C, at which burning was continued for a further 1 hour. During this burning step, the fumaric acid existing within the raw lead underwent sublimation and was removed. Finally, the thin resulting black lead was impregnated with polyethylene glycol No. 400.

The black lead thus produced was found to have a porosity of 22 percent, a bending strength of 23,000 grams/mm², and a reflectivity of 52 percent.

EXAMPLE 6

50 parts of graphite as a color material, 30 parts of a sulfite lignin having a lignin sulfonic acid sodium salt as its predominant constituent 20 parts of sodium cellulose glycolate, as a binder and 60 parts of a polyethylene emulsion, with water as a dispersion medium and with a non-volatile fraction of 25 percent, as a depolymerizable high polymer were kneaded together with approximately 600 parts of water by means of a kneader, a triple rolling mill, and the like. As this kneading was carried out the water content was adjusted to approximately 15 percent.

The resulting mixture was then charged into the cylinder of an extruder and extruded through a nozzle at an extrusion speed of 14.1 meters/second into a thin raw lead, which was dried. This raw lead was then burned by heating it gradually over a period of 70 hours in nitrogen gas from 160° to 300°C and further up to 1,000°C over a period of 5 hours, the burning being continued a further 1 hour at 1,000°C. During this burning step, the polyethylene existing within the raw lead depolymerized and evaporated off as the monomer or oligomer, thereby being removed. Finally, the thin black lead was impregnated with spindle oil.

The black lead thus produced was found to have a porosity of 34 percent, a bending strength of 24,400 grams/mm²., and a reflectivity of 45 percent.

EXAMPLE 7

40 parts of graphite and 10 parts of carbon black, as a coloring material, 50 parts of coal-tar pitch as a binder, and 15 parts of polytetrafluoroethylene in the form of a fine powder of an average particle size of 0.2 micron as a depolymerizable high polymer were kneaded together with approximately 300 parts of toluene by means of a kneader, a triple rolling mill, and the like.

The resulting mixture was then charged into the cylinder of an extruder and extruded through a nozzle at an extrusion speed of 4.8 meters/second into a thin raw lead, which was dried. This thin raw lead was then burned by heating in nitrogen gas to raise its temperature gradually over a period of 70 hours from 160° to 300°C and then over 5 hours up to 1,000°C, at which the burning was continued for a further 1 hour. During this burning step, the polytetrafluoroethylene existing within the raw lead depolymerized and evaporated off as the monomer, thereby being removed. Finally, the black lead was impregnated with spindle oil.

The black lead thus produced was found to have a porosity of 22 percent, a bending strength of 26,000 grams/mm.², and a reflectivity of 57 percent.

EXAMPLE 8

45 parts of graphite and 5 parts of carbon black, as a coloring material, 30 parts of gum arabic 20 parts of polyvinyl pyrrolidone, 5 parts of starch as a binder, 10 parts of zinc oxide in the form of fine powder of an average particle size of 0.1 micron as an inorganic substance, and 20 parts of an emulsion, with water as the dispersion medium and with a non-volatile fraction of 50 percent, of polystyrene as a depolymerizable higher polymer were kneaded together with approximately 200 parts of water by means of a kneader, a triple rolling mill, and the like. During this kneading step, the water content was adjusted to approximately between 13 and 14 percent.

The resulting mixture was charged into the cylinder of an extruder and extruded through a nozzle at an extrusion speed of 10.2 meters/second into a thin raw lead. After this thin raw lead was dried, it was burned by heating in argon gas to raise its temperature gradually over a period of 90 hours from 160° to 300°C and further over a period of 2 hours up to 600°C, at which the burning was continued for a further 1 hour. During the burning step up to 600°C, the polystyrene existing within the raw lead depolymerized and evaporated as a monomer or an oligomer, thereby being removed.

The raw lead thus burned at 600°C was immersed for 15 hours in 2 liters of a separately prepared 17-percent aqueous solution of hydrochloric acid to which 2 grams of Emulgen 930 had been added and was subjected to ultrasonic waves for 2 hours. After zinc oxide powder existing within the raw lead had been eluted out, the raw lead was washed with water and dried. The resulting thin raw lead was again heated gradually over a period of 5 hours up to 1,050°C, at which temperature it was burned for 1 hour. Finally, the resulting black lead was impregnated with oleic acid.

The black lead thus produced was found to have a porosity of 31 percent, a bending strength of 24,000 grams/mm²., and a reflectivity of 60 percent.

The measured properties of the black lead produced in the foregoing examples according to this invention and those of a black lead sold on the market are set forth in the following table.

| Black lead sample | Porosity (%) | Bending strength (g/mm2) | Reflectivity (%) |
| --- | --- | --- | --- |
| Sold on the market | 16 | 15,000 | 67 |
| Example 1 | 40 | 21,000 | 50 |
| " 2 | 29 | 22,000 | 57 |
| " 3 | 21 | 25,500 | 60 |
| " 4 | 29 | 24,500 | 57 |
| " 5 | 22 | 23,000 | 52 |
| " 6 | 34 | 24,400 | 45 |
| " 7 | 22 | 26,000 | 57 |
| " 8 | 31 | 24,000 | 60 |

Note 1. The porosity in each case was determined by causing a highly permeable liquid as, for example, benzyl alcohol, to be absorbed in the pores of the black lead, dividing the total volume of liquid absorbed ($V_e$) by the bulk volume of the black lead ($V_c$), and expressing the result as a percentage. Porosity (apparent)

$$= \frac{V_e}{V_c} \times 100$$

$$= \frac{W_3 - W_1}{W_3 - W_2} \times 100,$$

where: $W_1$ is the dry weight of the black lead prior to absorption of the liquid; $W_2$ is the weight of the liquid absorbed by the black lead and $W_3$ is the weight of the black lead after it has absorbed the liquid in its pores.

The porosity of each of the samples produced in the examples was measured prior to impregnation of the black lead with oil, while the porosity of the sample sold on the market was measured after the impregnated oil was extracted therefrom.

Note 2. The bending strength in each case was determined in accordance with the measuring procedure specified in Japanese Industrial Standards designation JIS-S 6019. More specifically, each black lead sample was supported horizontally as a beam on two pivotal supports spaced apart by a span L (30 mm.) in a Schopper tensile strength tester and was loaded at its midspan point, equidistant from the two pivotal supports, by a load P (gram). The load $P_b$ at which the black lead broke in bending was measured.

The bending strength ($f$) was determined from the following equation.

$$f = \frac{8 P_b L}{\pi d^3} = \frac{240 P_b}{\pi d^3}$$

where: $f$ is the bending strength in grams/mm.²; $P_b$ is the load (gram) at fracture; $d$ is the diameter (mm.) of the black lead; and L is the span (30 mm.) between the pivotal supports.

Note 3. The reflectivity was also determined in accordance with JIS-S6019. A lower numerical value of the reflectivity indicates a darker impression or line drawable by the black lead.

From the results as set forth in the foregoing table, it is apparent that the bending strengths of the black leads produced according to this invention are approximately 1.5 or more times that of the sample of the black lead available on the market. Furthermore, the porosities of the black leads of this invention are much higher. Accordingly, the regions of the black leads around the pores thereof crumble smoothly and evenly under a relatively light force during writing.

For this reason, the black leads produced in accordance with this invention have several advantageous features, the principal of which are soft feel of contact with paper, excellent writing feel, dark written or drawn lines even with a light writing force, and high bending strength. Because of the high bending strength, black leads of extremely small diameters, especially desirable for mechanical pencils and drawing instruments, can be produced.

While the porosity of the black leads can be adjusted at will in the practice of this invention, we have found that porosities in the range of from 20 to 40 percent result in particularly excellent balance of the properties of writing feel, strength, and darkness of drawn lines when the resulting pores of the black leads are impregnated with oils, fats, and waxes.

We claim:

1. In the production of a black lead by kneading a coloring material together with a binder or with a binder and a liquid, extruding the resulting mixture into a thin raw lead and burning said raw lead at a high temperature in a non-oxidizing atmosphere, the improvement wherein at least one pore-forming material selected from the group consisting of inorganic substances, sublimable organic compounds and depolymerizable high polymers is added to said mixture under kneading; the resulting mixture is extruded into a thin raw lead through the nozzle of an extruder at an extrusion speed of at least 4 meters per second; said thin raw lead is burned by heating it to raise the temperature thereof gradually from 150° to 300°C at a rate of less than 5°C/hr; and wherein the pore-forming material or materials are removed from the raw lead thereby to form minute continuous pores within the black lead.

2. The process as claimed in claim 1 in which the pore-forming material is at least one inorganic substance selected from the group consisting of zinc, aluminum, copper, cadmium, zinc oxide, cadmium oxide, magnesium oxide, zinc sulfide, calmium sulfide, calcium carbonate, barium carbonate, lead chromate, zinc chromate, sodium carbonate, sodium sulfate, and sodium chloride.

3. The process as claimed in claim 2 in which said at least one inorganic substance is removed from the raw lead by evaporation thereof in the burning step.

4. The process as claimed in claim 2 in which said at least one inorganic substance is removed by sublimation thereof in the burning step.

5. A process as claimed in claim 2 in which said at least one inorganic substance is removed from the raw lead by elution by immersing the raw lead in a liquid selected from the group consisting of aqueous acidic solutions, aqueous alkaline solutions, and water subsequent to the burning step or in between burning steps.

6. The process as claimed in claim 2 in which said at least one inorganic substance is removed from the raw lead by elution by immersing the raw lead in a liquid selected from the group consisting of aqueous acidic solutions, aqueous alkaline solutions, and water after the burning step.

7. A process as claimed in claim 2 in which said at least one inorganic substance is removed from the raw lead by eluting out one portion of the inorganic substance by immersing the raw lead in a liquid selected from the group consisting of aqueous acidic solutions, aqueous alkaline solutions, and water subsequent to the burning step and upon removal from the liquid, burning the raw lead further at a high temperature thereby to cause removal of the remaining inorganic substance by evaporation of sublimation thereof, whichever occurs.

8. The process as claimed in claim 1 in which the pore-forming material is at least one sublimable organic compound selected from the group consisting of Alizarin Blue having a Color Index Number of 62105, furan-2,5-dicarboxylic acid, isophthalic acid, 2-hydroxyanthraquinone, 2,7-dihydroxyanthraquinone, fumaric acid, fluoresceine, isonicotinic acid, terephthalic acid, anthraquinone, naphthacene, 5-methylisophthalic acid, thioindigo, salicylic acid and triethylamine hydrochloride and is removed from the raw lead by sublimation in the burning step.

9. The process as claimed in claim 1 in which the pore-forming material is at least one depolymerizable high polymer selected from the group consisting of polyethylene, polypropylene, polyisobutylene, polystyrene, poly $\alpha$-methylstyrene, polymethacrylate, polytetrafluoroethylene, natural rubber, butyl rubber, nylon, and polymetamethylstyrene and is removed from the raw lead by depolymerization in the burning step and evaporation.

10. The process as claimed in claim 1 in which the thin raw lead is burned by heating to raise the temperature thereof gradually from 150° to 300°C at a rate less than 5°C/hour and subsequently burning the same at a temperature of at least 700°C in a non-oxidizing atmosphere.

11. The process as claimed in claim 1 in which said at least one pore-forming material is added to said mixture in a finely divided form.

* * * * *